Patented Nov. 22, 1949

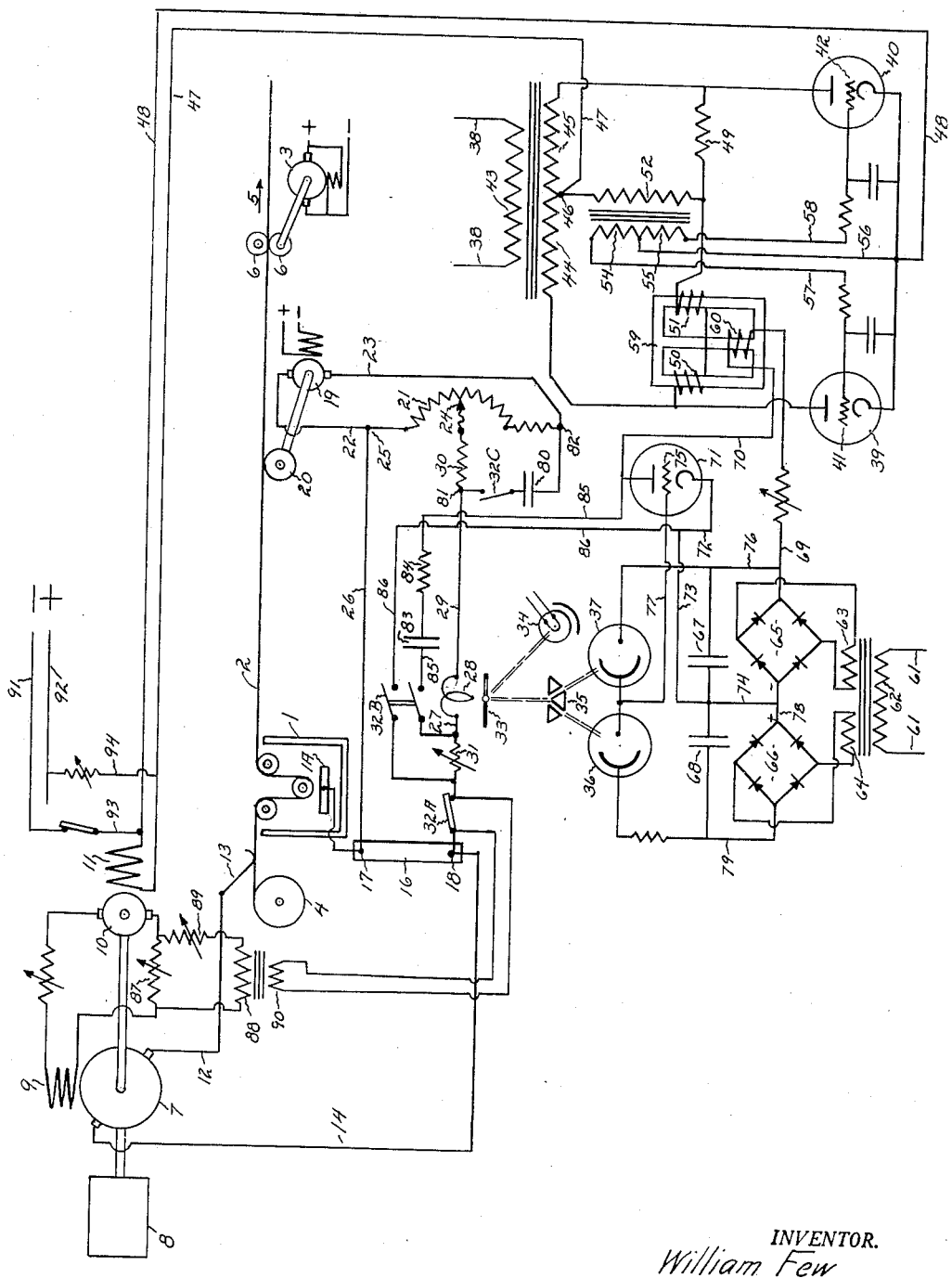

2,488,856

UNITED STATES PATENT OFFICE 2,488,856

AUTOMATIC ELECTRIC REGULATION OF ELECTROPLATING APPARATUS

William Few, Cleveland, Ohio, assignor to The Clark Controller Company, Cleveland, Ohio, a corporation of Ohio Application November 24, 1943, Serial No. 511,579

2 Claims. (Cl. 204—211)

This invention relates to regulating apparatus in which the relative values of two measurable physical factors such as temperature, speed, amperage, pressure, etc. are automatically regulated to maintain a preselected quantitative relation, or ratio, between them.

There are several possible cases of such regulation. In one case, one of the factors has a constant or reference value and the other factor tends to vary but is regulated to a value at which it has a preselected normal ratio to the constant factor, and therefore the variable factor is itself regulated to a constant value. In another case, one of the factors varies and the other factor is regulated to cause it also to vary, but in a manner to maintain the preselected normal ratio between it and the varying factor. In another case, both of the factors tend to vary and at least one of them is regulated to maintain a normal ratio between them.

In the first case, the factor which is regulated is the one which tends to change or vary. In the second case, the factor which is regulated is the one which tends to remain constant. In the third case, the factor which is regulated may be either of the two which tends to vary.

In each case, there is a normal ratio between two factors which is to be maintained by the regulating action, and the regulating action is caused to occur when the ratio between the factors changes from the preselected normal.

The present invention is applicable to all of these and other types of regulation.

In all prior regulating apparatus of this general class of which I have knowledge, there must be a change of considerable amount in the value of one of the factors (increase or decrease), before the regulating function of the apparatus begins, to restore the ratio of the factors to normal.

Illustrative of such apparatus is that in which a pivoted finger carrying an electric contact has movement back and forth between a pair of stationary electric contacts, responsive to increases or decreases of the variable factor. The factor must change by an amount sufficient to cause the movable contact to move over a distance to make engagement with one or the other of the stationary contacts before the regulating action of the apparatus starts. The inaccuracy of the regulation, that is the percentage of unavoidable deviation from the normal ratio, is therefore high, because of this unavoidable range of change, or "dead zone," within which no regulating action occurs.

Again, in prior regulating apparatus of this class generally, after the regulating action begins, a time interval must elapse to allow time for the regulating action to restore the normal ratio of the factors, and if the ratio has changed greatly from normal, this time lag is correspondingly great. Illustrative of such apparatus is that in which regulation is effected by apparatus driven by an electric motor always at the same speed, regardless of the amount of change of the ratio to be corrected.

Regulation according to the present invention, to restore the factors to their normal preselected ratio, is accomplished by regulating apparatus responding instantly upon the occurrence of and concurrently with departure of the said ratio from normal; and the regulating action is of variable intensity or effectiveness and always proportional to or commensurable with the amount of the departure of the ratio from normal; whereby the said "dead zone" during which regulation is absent is completely eliminated, and whereby also the time interval or the time lag between the start of the regulation and the ultimate restoring of the factors to their normal ratio, is eliminated or reduced to a negligible minimum.

As the result, the accuracy with which the normal preselected ratio between two factors can be maintained, far exceeds that possible with any prior regulating apparatus of which I have knowledge.

The underlying principles of the present invention by which regulation having the improved characteristics mentioned above may be effected, may be applied to various types of regulation, three illustrative types of which are mentioned above; and they may be applied to different kinds of factors some of which have been mentioned; and may be applied to apparatus in the various arts and processes; and in each instance the elements of the regulation will be correspondingly different.

It would be impracticable therefore to attempt to illustrate and describe herein the various forms which the apparatus would take if the principles of the invention were applied to its various possible uses; and therefore, in order to set forth herein at least one concrete embodiment of the principles of the invention as required by the Statutes, I have chosen to illustrate and describe herein the application of the invention to an electroplating apparatus, to regulate a continuous process of plating sheet metal.

In such a process, a strip of sheet metal to be plated is continuously drawn through the plating bath by power at a preselected generally constant speed; and electric current for plating it is continuously supplied by an electric generator at amperage preselected to accord with the speed of the strip and the desired thickness of the plating on the strip.

The two factors involved are in this instance the speed of the strip and the plating current amperage; and the ratio between them (the aforesaid normal ratio) when once established by adjustments is to be maintained by the regulation.

In the preferred practice of the invention, two mutually opposing electric potentials are produced, acting on the energizing electric circuit of a mirror galvanometer, one corresponding in value to the speed of the strip, and the other corresponding in value to the plating current amperage.

In the preferred mode of operation, when the ratio of these two speed and amperage factors is at the normal, these two potentials are equal and neutralize each other and no current flows in the galvanometer energizing circuit.

If either factor should change and thereby change the normal ratio, one of the two potentials will then be correspondingly greater than the other, and current will accordingly flow and deflect the galvanometer.

A photo-electric tube arrangement is provided, subjected to different degrees of illumination by deflections of the galvanometer mirror, and changes of the photo-tube output effected thereby, actuate apparatus to cause changes to occur in the plating current output of the plating generator by controlling its field energization.

Any increase in the speed of the strip driving motor or any decrease in the plating current, causes an increase in generator field current, to increase the plating current and restore the ratio of speed and current to normal; and similarly any decrease in speed or increase in the plating current is compensated for by a decrease in the field energization and plating current output to restore the ratio to normal.

In this particular application of the invention as will now be in general apparent, and as will be more particularly explained hereinafter, a very slight change of the normal ratio between the strip speed and the plating amperage, causes a corresponding concurrent change in the field current; and if the change of the ratio be small the change of the field current will be small and vice versa. A change in the field current therefore occurs instantaneously or concurrently with a change in the normal ratio of the two factors being regulated; and also the changes in the field current are proportional to the amount of the change of the ratio of the two factors; these two characteristics being among the advantages and improvements of this invention as mentioned hereinbefore.

It will also be seen that regulation of the plating process here under consideration, may occur in either of several ways. If the speed of the strip driving motor remains constant, and the plating amperage should change, the regulation will restore the amperage to its original value. The regulation thus maintains a constant value of plating current, to maintain the normal ratio. If the plating current amperage tends to remain constant but the speed of the strip should change, then the plating amperage is changed to a corresponding new value to maintain the ratio. If both the strip speed and plating current should change, the normal ratio might or might not change, but if it does change, the plating current would be changed to maintain the normal current-to-speed ratio.

Some of the objects of the invention will be seen in the foregoing. Others are:

To provide generally an improved regulating system of the class referred to;

To provide a regulating system in which regulating action is initiated immediately upon and concurrently with the occurrence of a change of a factor or ratio or quantity to be regulated;

To provide in a regulating system of the class in which a regulating action corrects for the deviation from normal of a variable factor or ratio or quantity, improved means for causing the effectiveness of the regulating action to be commensurable with the quantity or degree of deviation;

To provide a regulating system in which the ratio between two factors is regulated to a normal ratio by varying a continuously flowing, regulating, electric current, and comprising improved means to cause variations of the current to occur concurrently with deviations of the ratio from normal and to be quantitatively commensurable with the degree of deviation;

To provide in a regulating system of the class referred to and utilizing a galvanometer, improved means for stabilizing movements of the movable element of the galvanometer;

To provide in a regulating system of the class referred to in which, as a part of the regulating functions, an electric current varies, improved anti-hunting means to prevent fluctuations of the current above and below an optimum value;

To provide in a regulating system of the class referred to in which a regulating action is initiated upon the occurrence of a variation of a continuously flowing electric current, improved means for temporarily magnifying the effectiveness of the regulating action at its initiation, to overcome the retarding or delaying effects of inductance.

Other objects will be apparent to those skilled in the art to which my invention appertains.

The invention is fully disclosed in the following description taken in connection with the accompaying drawing in which:

The figure is a diagrammatic illustration of an embodiment of my invention associated with a continuous strip plating apparatus to regulate the plating process.

Referring to the drawing, I have shown at 1 a plating tank through which a strip of sheet metal 2 is continuously drawn by an electric motor 3 from a roll 4 upon which a supply of it is wound. The motor 3 is shown as propelling the sheet 2 in the direction of the arrow 5 by rotating a pair of rollers 6—6 between which the sheet is pressure engaged. As shown diagrammatically, the motor 3 is a direct current shunt motor and therefore tends to run in general at a constant speed although as is well known the speed will not be absolutely constant. The actual structure of these parts constitutes no essential part of the present invention and may take any of several known forms, and therefore has been shown diagrammatically.

Plating current is supplied by an electric generator 7, driven by a suitable source of power 8 and having a field winding 9 energized by a driven exciter 10 having an exciter field winding 11. One output main 12 from the generator 7 is shown diagrammatically as making sliding contact with the moving sheet 2 by a brush 13; and the other output main 14 of the generator is connected to an electrode 1A in the plating tank 1, through a resistor 16 of low resistance.

The resistor 16 is shown as having the terminals 17—18 and the flow of current through the resistor 16 produces a difference of potential between the terminals 17 and 18 which evidently will be proportional to the amperage of the plating current flowing through the resistor, and this potential may hereinafter be referred to as the "plating current potential."

At 19 is an electric generator, preferably of the electric tachometer type, driven at a speed corresponding to the speed of the moving sheet 2, and this drive may be effected in any suitable or known manner; and I have illustrated this drive diagrammatically as comprising a roller 20 engaging and rotated by the moving sheet and connected to the generator 19 to drive it. A resistor 21 is connected in the output circuit of the generator 19 by wires 22 and 23. A movable tap connection 24 is adjustable along a part of the resistor 21, and as will be apparent, there will be a difference of potential between this contact 24 and one of the terminals say the terminal 25 of the resistor, which potential will be proportional to the speed of the generator 19 and of the sheet 2, and may hereinafter be referred to as the "sheet-speed potential."

The above mentioned terminals 17 and 25 are connected by a wire 26. The terminal 18 and the contact 24 are similarly connected by a circuit comprising a wire 27, the energizing coil 28 of a galvanometer, and a wire 29. In the line of the wire 29 is a resistance unit 30 and in the line of wire 27 is a resistance unit 31 and a switch 32A; and associated with the resistors 30 and 31 are illustrated other adjacent circuits and parts controlled by switches 32B and 32C. The functions of these resistors and associated parts will be described later but for the present they can be disregarded by considering the switch 32A as closed and the switches 32B and 32C as open.

The polarities of the generators 7 and 19 are predetermined so that the said two potentials are mutually opposed; and when the system is in normal use these two potentials, in the preferred mode of operation, are equal and neutralize each other and the galvanometer winding 28 is not energized.

This condition of equal balanced potentials will obtain when the plating current amperage and the speed of the sheet are at the correct values to provide the desired thickness of plate, and as will be apparent, if the plating current for any reason should increase or decrease, or, if for any reason the speed of the sheet should increase or decrease, the plating current potential will then be higher or lower than the sheet speed potential, and current will accordingly flow in one direction or the other through the galvanometer winding 28, over the circuit 18, 17, 26, 25, 21, 24, 29, and 18.

By means to be described, energization of the galvanometer winding initiates a regulating action which changes the energization of the exciter field winding 11, thereby changing the plating current output of the generator 7 to a value at which the said current potential again balances the speed potential, whereupon the galvanometer is thereby again de-energized, but as will be described, the plating current continues at its changed value. Thus a predetermined normal ratio between the plating current and the sheet speed is maintained by regulating the value of the plating current; and it will be apparent that this ratio may be adjusted by adjusting the contact 24 along the resistor 21, to establish desired plating results for the particular job in hand.

The galvanometer referred to is of the mirror type comprising a mirror 33, deflected by the winding 28 when energized. A beam of light from a lamp 34, directed upon the mirror 33, is reflected therefrom through a prism system 35, by which it is split into two beams, each illuminating one of a pair of photo-electric tubes 36 and 37.

Arrangements of photo-electric tubes, and prism systems and mirror galvanometers, of this general class, are known, and the arrangement utilized here constitutes in itself no essential part of the present invention. Preferably, I employ an arrangement which actuates two photo-tubes such as 36—37 equally, when the mirror 33 is in one position and which, upon movement of the mirror 33, in either direction from that position causes one photo tube to be illuminated to a greater degree than the other, and to have correspondingly a greater output. Also I prefer to employ a mirror galvanometer of the type having a torqueless mirror, that is, one supported so as to float or move freely when deflected and without any means to return it to a normal or neutral position.

Other parts of apparatus and electrical connections therefor not described above will now be described in connection with a description of the operation of the apparatus as a whole.

In this description of operation it will be assumed that the apparatus is running, and that the desired normal ratio between the plating current and the speed of the strip has been determined. This presupposes that the field winding 11 of the exciter 10 is energized, and therefore its energizing circuit will first be described.

This energization is supplied from an alternating current source indicated at 38—38, through the agency of a pair of rectifier tubes 39 and 40 of the three element type comprising respectively grids 41 and 42. The primary 43 of a transformer, energized from the mains 38—38, energizes a two part secondary 44—45, from the mid point 46 of which one main 47 leads to the field 11, the return main 48 from the field 11 being connected to the two cathodes of the tubes 39 and 40. The anodes of the tubes 39 and 40 are respectively connected to the outer ends of the secondaries 44—45. A full wave rectifier of known type is thus provided, the field winding 11 being energized by a succession of uni-directional half waves of current.

The grids 41 and 42 of the tubes 39 and 40 are energized by alternating potential, the phase angle of which is shifted back and forth for regulating purposes. The tubes 39 and 40 are rectifier tubes preferably of the type which fire only when their grids are energized at or above the firing potential characteristic of the tube, and having fired in any part of a half wave continue to pass current to the end of the half wave. By energizing the grids 41—42 with alternating potential and by shifting the phase angle of the potential these tubes will be caused to fire earlier or later in the half cycle and accordingly pass more or less of each successive half wave of rectified current, whereby the energization of the exciter field winding 11 may be varied.

This phase shifting is accomplished by a network as follows. A resistance unit 49, and an inductance unit 50—51, are connected in series with each other across the ends of the secondaries 44—45. A transformer primary 52 is connected at one end to the mid-point 46 of the secondary 44—45 and at its other end to a point between the resistance unit 49 and the inductance unit 50—51. The primary 52 energizes a two part secondary 54—55 the mid-point of which is connected by a wire 56 to the cathodes of the two tubes 39 and 40, and the two ends of which secondary are connected respectively by wires 57 and 58 to the grids 41 and 42 of the tubes.

With such a network, if the value of the inductance of the unit 50—51 be changed, the phase of energization of the grids 41 and 42 will be shifted, for the purposes just described.

To thus change the inductance of the unit 50—51, a saturable reactor is employed of which the unit 50—51 is a part. A core 59 is provided upon two legs of which a pair of windings are wound, respectively, and together constitute the inductance unit 50—51; and upon the middle leg of the core 59, a winding 60 is provided, energized with direct current.

Means will now be described for keeping the winding 60 energized with direct current to energize the core 59 magnetically at a preselected proximity to saturation, whereby the inductance unit 50—51 is caused to have, normally, a preselected inductance, and whereby the resulting phase angle of the grid energization causes the tubes 39—40 to supply a normal energizing current to the field winding 11. This condition corresponds to the normal ratio condition of the plating current and strip feed.

Means is provided by which if the normal ratio of current and speed should be disturbed, the direct current energizing the winding 60 will correspondingly change, thereby changing the inductance of the unit 50—51, and the phase angle of energization of the grids 41—42, and correspondingly changing the energization of the field winding 11, to restore the said normal ratio as referred to above.

The direct current for the winding 60 is derived from alternating current mains 61—61 by rectification, and the value of this direct current is varied for the purposes just described through the agency of the photo-electric tubes 36—37 as will now be described.

A transformer primary 62 energized from the mains 61—61 energizes two secondaries 63 and 64, each of which supplies potential to a full wave bridge rectifier, 65 and 66 respectively. Pulsations in the output current of the rectifiers 65 and 66 are filtered out by condensers 67 and 68.

The rectifier 65 supplies uni-directional current by a wire 69, to the winding 60 referred to above, thence by a wire 70 to the anode of a tube 71 and thence to the cathode of the tube, and thence by wires 72, 73, and 74 back to the rectifier 65.

The tube 71 has a grid 75 and is of a type which passes current the value of which may be increased or decreased by changes of potential of its grid 75.

The rectifier 65, besides performing the function of energizing the winding 60, also functions jointly with the rectifier 66 to apply potential upon the grid 75. The grid 75 is subjected to the potential of the rectifier 65 by connections comprising a part of the wire 69, a wire 76, the photo-tube 37, a wire 77 connected to the grid 75, the tube cathode, and the wires 72, 73, and 74; and the grid is subjected to the potential of the rectifier 66 by connections comprising a wire 74, 73, and 72, the tube cathode, to the grid 75, wire 77, the photo-tube 36 and a wire 79; and the said connections are made to the rectifiers 65 and 66 so that these two potentials oppose each other.

It will be apparent therefore that if the mirror 33 swings in either direction, and thereby changes the relative illumination and the relative output potential of the tubes 36 and 37, the potential on the grid 75 will be thereby changed and the current through the tube 79 will be increased or decreased accordingly.

By this means, the current energizing the winding 60 is caused to increase or decrease, as one of the photo-tubes is activated more than the other by deflection of the mirror 33.

To summarize the foregoing, a change of the normal ratio of plating current to sheet speed, causes the potential drop in the resistor 16 to be different from that in the resistor 21; and this causes current to flow in the galvanometer winding 28 in one direction or the other. This moves the galvanometer mirror 33 in one direction or the other and changes the relative activation of the photo-tubes 36 and 37, and accordingly changes the potential on the grid 75 of the tube 71. Current which is flowing through the tube 71, and in the winding 60, under impulsion of the potential of the full wave rectifier 65, and which establishes an inductance value for the unit 50—51, is thereby changed and correspondingly changes the inductance value of the unit 50—51. Change of inductance value of the unit 50—51 shifts the phase angle of the grids 41—42 of the tubes 39 and 40, causing them accordingly to fire earlier or later as the case may be, and this changes the energization of the exciter winding 11 which receives its current as full wave rectified current through the tubes 39 and 40. The polarities throughout are such that this change of excitation of the exciter 10, changes the output of the plating current generator 7, to restore the normal ratio of current and speed.

The galvanometer mirror 33 is preferably mounted in such manner as to be torqueless that is, so that it does not tend to return to some neutral or central position (for example by means of a centering spring) when the winding 28 is unenergized, but is supported so that it will tend to remain in whatever position it is moved to by the winding.

The utilization of a torqueless mirror permits the mirror to take up a position of rest at a central position or at one side or the other of a central position when the two regulated potentials have been brought to their normal ratio; and when the conditions are such that the normal ratio obtains with equal output potentials of the photo-tubes 36 and 37, the utilization of a torqueless mirror permits the mirror to take up a position of rest corresponding to these conditions whether the characteristics of the photo-tubes are identical or not, that is whether they deliver equal potentials when they are equally illuminated or when they are illuminated unequally. A torqueless mirror therefore eliminates the necessity of a perfect balancing of the two opposing circuits which energize the grid 75 of the tube 71; and the necessity of identity of output characteristics of the photo-tubes 36 and 37; and the necessity of identity of output of the rectifiers 65 and 66, or of the transformer's secondaries 63 and 64. When the normal ratio is established or reestablished by deflection of the mirror, the mirror remains at rest in its position for normal ratio, and thus maintains the ratio at normal.

From the foregoing discussion, it will be seen that a mirror having a centering or return spring tending to return it to a central position could be used in some cases if desired but at a sacrifice.

to a greater or lesser degree, of the advantages above set forth.

Again, by utilizing a torqueless mirror, it will move when the energization of the winding 28 is barely enough to overcome friction of the supporting means for the mirror 33 which renders the response of the apparatus exceedingly sensitive to changes of the ratio between current and speed. A support for the mirror can be made without difficulty such that a deviation from the normal ratio of one-tenth of one percent will be sufficient to cause the apparatus to effect the correcting regulating action; and this percentage of deviation may be reduced farther and farther merely by increasing the potentials produced respectively by the current and by the speed in the resistors 16 and 21. The friction of the mounting for the galvanometer mirror will in many cases be a sufficient brake upon its movement to render its movement stable, but in cases in which it is not sufficient, it may be further stabilized by an arrangement to be described later.

As described above, whenever a deviation from the normal ratio occurs, the ratio is again restored to normal by a change of excitation of the exciter 10. As is well known, the output current of the generator 7, excited by the exciter 10, will not change instantly upon a change of excitation of the exciter winding 11 by the regulating apparatus; there will be a time lag because of the changes in the highly inductive fields which must first occur; but for a like reason, the need for corrective changes in the current output of the generator 7, will in general occur slowly or gradually; so that the system is capable of correcting the tendency for the plating current to change, concurrently with the current change itself; so that the time lag referred to introduces no detrimental inaccuracy.

In some cases however, the deviation from the normal ratio may be caused by a change in the speed of the strip, and such a change of speed may occur within a short interval of time, and more rapidly than the more slowly acting correction through the agency of the exciter and generator can be effected. It may therefore be desirable to have the regulating action overcompensate or be magnified, at the time of being initiated, in those cases in which the deviation from the normal ratio is caused by a change of the speed of the sheet; and this provision has been incorporated in the present invention and will now be described.

The means for accomplishing this result comprises the above mentioned resistor 30, and a condenser 80 bridging the inner end 81 of the resistor and the lower end 82 of the resistor 21; and is brought into action by closing the switch 32C.

It will be noted that when the normal ratio obtains, no current will be flowing in the wire 29 or resistor 30, and the condenser 80 will have a charge thereon represented by the drop of potential between the points 82 and 24. If now the speed of the sheet should change, for example, increase, and cause the potential of the generator 19 to increase, current will flow in the wire 29 and galvanometer winding 28 because of the increase of potential between the points 24 and 25 and will start the regulating action and increase the energization of the exciter winding 11. Since current now flows through the resistor 30 and produces a drop of potential therein, the galvanometer is actuated by current produced by the potential between the points 25 and 81.

The condenser 80 is now subjected to an increased charging potential, namely that between the points 82 and 81, and the charging current flowing therethrough is added to that in the wire 29 and coil 28, and this causes the system to regulate in response to a magnified galvanometer current; and the exciter field current is accordingly raised to a magnified or excess value. After a time interval, the condenser 80 becomes charged to a new and higher potential, and the flow of current through it ceases and correspondingly a greater proportion of the total drop of potential occurs between the points 82 and 81; so that the potential from the point 25 to the point 81 reduces and the current to the galvanometer is no longer magnified, and the current to the field winding 11 therefore tends to be regulated in accordance therewith and no longer to an excess value.

Of course, during all of the time that the potentials are out of balance because of the increased speed of the generator 19, the plating current from the generator 7 has been increasing to restore the normal ratio. The net result as will be apparent is that when the strip speed potential of the generator 19 first increases, the current to the galvanometer winding is magnified beyond the value corresponding to this increased potential; and as a time interval (determined by the condenser 80) elapses, this galvanometer current falls back to the value corresponding to the strip speed potential; and correspondingly the exciter is first excited by its field winding 11 to an excess value, a value beyond that necessary to ultimately cause the plating current potential to balance the strip speed potential, and then gradually falls back to the value at which the potentials are again balanced and the normal ratio again restored.

Thus the increase of plating current necessary to correspond to the increased strip speed is arrived at quickly, and the long time interval which would otherwise be necessary because of the inherent time lag in the inductive generating system is eliminated. It is believed to be apparent that a similar result is obtained with the parts as described when the change of speed is a reduction instead of an increase.

In some instances, it has been found that the movement of the galvanometer mirror 33 is unsteady or unstable. The cause of this is not known with certainty, but I have found that the following means corrects this instability. The means comprises the above mentioned resistor 31; a condenser 83 and a resistor 84 in the line of a wire 85 from one end of the resistor 31 to the anode of the tube 71; and a wire 86 connecting the other end of the resistor 31 to the cathode of the tube 71. This circuit is brought into action by closing the switch 32B.

When the normal ratio is present, and the system is in balance, there is a steady flow of current through the tube 71, and no current is flowing in the galvanometer winding 28. When however the normal ratio is disturbed and current flows through the galvanometer winding 28, it causes the current in the tube 71 to change in value as described. A change of value of the main current in the tube 71 is accompanied by a change of potential between its anode and cathode; and this potential being impressed upon the wires 85 and 86 causes a flow of charging current through the condenser 83 (or a flow of discharge current out of it as the case may be) and through the resistor 31. This current in the resistor 31 produces potential therein opposing the flow of current actuating the galvanometer 28, and is in proportion to the change of current in the tube 71. When the current in the tube 71 stops changing, the current in the wires 85 and 86 and in the resistor 31 in series therewith ceases to flow, being blocked by the condenser 83. This temporary potential, opposing the flow of current in the winding 28 acts somewhat in the nature of a brake on movements of the mirror 33 and steadies and stabilizes the same.

In some cases, I have found that there is a tendency for the plating current output of the generator 7 to fluctuate or "hunt." If the normal ratio is suddenly disturbed, for example in the sense that the drop in the resistor 16 is too small and must be increased by an increase of plating current, the galvanometer winding 28 will be suddenly energized and in moving the mirror 33 to a correcting position may cause it to overtravel. The field excitation and the plating current will therefore be increased excessively and the mirror 33 will be moved again in the reverse direction to lower the plating current. The plating amperage when changed therefore, may tend to hunt back and forth instead of at once becoming steady at the normal ratio.

To correct this hunting tendency, the following means is provided, and may be brought into action by opening the switch 32A. In the direct current output circuit of the exciter 10 is an adjustable resistor 87 for producing an adjustable drop of uni-directional potential; this potential energizes the primary 88 of a transformer through an energization adjusting resistor 89. The secondary 90 of the transformer is in series with the galvanometer winding 28, when the switch 32 has been opened. Whenever a change of potential in the resistor 16 causes the current to flow in the galvanometer winding 28 and effect movement of the mirror 33 to change the excitation of the exciter winding 11 and change the exciter output, the change of output causes a change in the energization of the transformer primary 88 and this generates a potential in the secondary 90, at the terminals of the switch 32A, opposing the current in the galvanometer winding 28. This produces, in effect, a delaying or damping action on the mirror 33 causing it to move more slowly and to stop at a position in which the normal ratio is restored, instead of moving beyond that position, whereby the hunting is obviated.

The switches 32A, 32B, and 32C or either of them may be dispensed with when the supplemental features which they control are always wanted as will be obvious.

If at any time during the operation of the system, the feeding of the strip by the motor 3 should stop or be interrupted due to any cause, the regulating action, as will be apparent from the foregoing, will reduce the excitation of the excited field 11 to zero tending to cut off the plating current. However, residual magnetism in the exciter field or in the generator field 9, will cause a substantial plating current to continue to flow, and this of course would spoil the plating job on the strip. To overcome the detrimental effects of such abnormal operation, the following means is provided. A source of direct current 91—92 is provided, and is connected by wires 93 and 94 across the exciter field winding 11, and in the direction as to polarity to oppose energization of the winding 11 supplied thereto through the tubes 39 and 40; and of a potential at least great enough, and preferably greater than enough, to reduce to zero the residual magnetism in the field of the exciter.

With this arrangement if the strip feed should stop and the regulating action should reduce the exciter field current supplied by the tubes 39 and 40 to zero, this outside source of direct current will destroy the residual magnetism in the exciter and bring the plating current to zero.

If necessary, the potential of the wires 93—94 may be sufficiently high to reverse the excitation of the exciter to destroy the residual magnetism in the main generator field 9.

In either event, the plating current will be brought to zero. With the strip speed at zero, and with the plating current once brough to zero, then thereafter the system will regulate to maintain the said normal ratio accurately if the strip movement should again start, and the plating current will be regulated to increase and be at the correct value as the strip speed increases; so that provision is thus made by which the feed of the strip can be intentionally shut down and started up again without spoilage of the work in process.

The transformer primaries 43 and 62 are shown in the drawing as energized from different sources of alternating current but this is to simplify the drawing and in practice the mains 38—38 and 61—61 would preferably both be connected to the same alternating current source.

While in the drawing I have shown two photoelectric tubes 36 and 37, each as a separate tube, it will be understood that the invention can be practiced with a double type tube in which both pairs of light-responsive elements are enclosed in a single envelope.

In further explanation of the character of the regulating action described above it will be noted that the mirror 33 will move very sensitively in response to very small current in its winding 28; and for each position which it occupies there will be a corresponding value of current in the field winding 11, large current and small current for extreme positions in its range of movement, and intermediate values of current for intermediate positions. The field current starts to change at the instant the mirror starts to move; and the mirror starts to move at the instant the normal ratio of current and speed is disturbed; and the field current keeps on changing until the ratio is restored; and if the mirror is moved through a relatively large angle, the field current changes more rapidly in approaching its new value than if the mirror moved through only a small angle.

The correcting or regulating action therefore is initiated immediately upon a change of position of the mirror and is commensurable in effectiveness with the amount of its change of position and during movement of the mirror increases in effectiveness at a rate commensurable with the rate of movement of the mirror in changing position; and when the regulating action has restored the normal ratio, the mirror remains in the position to which it was moved by the departure from the normal ratio and maintains the ratio at normal. Stated in other words, the regulating function is initiated immediately upon a departure of the said current-and-speed-ratio from normal; and continues effective so long as any departure from normal ratio continues; and ceases when the normal ratio is reestablished; and its effectiveness is commensurable with the degree of departure of the ratio from normal; and if the degree of departure from the normal ratio increases, the effectiveness of the regulating action correspondingly concurrently increases.

Changes and modifications may be made in the particular embodiment of my invention herein disclosed, as will occur to those skilled in the art, without departing from the spirit of my invention; and my invention may be applied to other specific uses than the regulating of an electro-plating apparatus as will be understood; and my invention therefore comprehends all such changes and modifications and applications which come within the scope of the appended claims.

I claim:

1. In a continuous strip plating system; an electric plating apparatus; feeding means continuously feeding a strip of metal to be plated through the plating apparatus; plating current supply means supplying electric current to the plating apparatus; the current amperage and strip speed being adjustable relatively to have a predetermined quantitative ratio value at which a desired plating operation is performed on the strip; an automatic regulating means comprising an actuating circuit and means subjecting the circuit to two opposing potentials one proportional to the amperage and the other proportional to the strip speed, and comprising an actuated movable element movable in one direction or the other respectively upon energization of the actuating circuit responsive to the imbalance of the said potentials effected by the preponderance of one potential over the other occurring upon a change of said ratio value; the control comprising an electronic control tube having an anode and a cathode and a control grid, and responsive to variable energization of the grid to vary the anode-cathode current; a net work energized by current supplying means and the net work supplying anode-cathode current; the net work comprising photo-tube means; light producing means and means responsive to said movements of the movable element in one direction or the other to variably illuminate the photo-tube means by light from the light producing means; the net work supplying grid energization variable with variable illumination of the photo-tube means, and correspondingly varying the anode-cathode current; the plating current supply means comprising a plating current generator and a control therefor responsive to variations of anode-cathode current to vary the plating current; a potential impressing circuit energized by the potential across the anode-cathode, and containing a resistor, and momentarily impressing a third potential on the actuating circuit provided by drop in the resistor and variable in accordance with variations of anode-cathode current; and a capacitor in the potential impressing circuit preventing current flow and drop in the resistor except when the potential across the anode-cathode is varying.

2. In a continuous strip plating system; an electric plating apparatus; feeding means continuously feeding a strip of metal to be plated through the plating apparatus; plating current supply means supplying electric current to the plating apparatus; the current amperage and strip speed being adjustable relatively to have a predetermined quantitative ratio value at which a desired plating operation is performed on the strip; an automatic regulating means comprising an actuating circuit and means subjecting the circuit to two opposing potentials one proportional to the amperage and the other proportional to the strip speed, and comprising an actuated movable element movable in one direction or the other respectively by current in the actuating circuit responsive to the imbalance of the said potentials effected by the preponderance of one potential over the other occurring upon a change of said ratio value; and movable at a rate commensurable with the amount of preponderance; the plating current supply means comprising an electric generator and a generator control to vary its current output; the generator control comprising means responsive to variations of main current through an electronic control tube, having a control grid; a net work energized by current supplying means and the net work supplying main current through the tube; the net work comprising photo-tube means, and energizing the control grid variably to vary the current through the control tube responsive to variations of illumination of the photo-tube means; light producing means and means coacting with the movable element to vary the illumination of the photo-tube means by light from the light producing means in correspondence with different positions of the movable element; whereby the illumination is varied more rapidly by more rapid movement of the movable element effected by a greater preponderance of one said potential over the other in the actuating circuit; and means responsive to the occurrence of preponderance of that potential which is proportional to strip speed to temporarily augment the resultant current in the actuating circuit, comprising a resistor in the actuating circuit and a normally charged condenser bridging the resistor.

WILLIAM FEW.

REFERENCES CITED

The following references are of record in the file of this patent:

UNITED STATES PATENTS

| Number | Name | Date |
| --- | --- | --- |
| 1,820,786 | Eaton | Aug. 25, 1931 |
| 1,965,399 | Wehe | July 3, 1934 |
| 2,066,934 | Gulliksen | Jan. 5, 1937 |
| 2,136,682 | Gilbert | Nov. 15, 1938 |
| 2,147,422 | Bendz | Feb. 14, 1939 |
| 2,251,277 | Hart | Aug. 5, 1941 |
| 2,325,401 | Hurlston | July 27, 1943 |
| 2,427,661 | Cook | Sept. 23, 1947 |